United States Patent Office 3,323,863
Patented June 6, 1967

3,323,863
AMMONIUM PHOSPHATE FERTILIZER PROCESS
James E. Seymour, Lake Wales, Fla., assignor to Armour and Company, Chicago, Ill., a corporation of Delaware
No Drawing. Filed May 16, 1962, Ser. No. 195,340
5 Claims. (Cl. 23—107)

This invention relates to an ammonium phosphate fertilizer process, and more particularly to the manufacture of monoammonium orthophosphate, diammonium orthophosphate, and to the utilization of the mother liquor in the forming of additional products. The process is particularly useful in the manufacture of ammonium orthophosphate from wet-process phosphoric acid and the utilization of the residual motor liquor thereof containing impurities.

The manufacture of ammonium orthophosphates from saturated mother liquor, and particularly from wetprocess phosphoric acid containing impurities, while at the same time finding a means for utilizing residual material containing the impurities, has presented a problem for some time. As reported by workers in this field in Agricultural and Food Chemistry, vol. 3, No. 1, page 43, January 1955, "The impurities in the wet-process acid precipitated in an unfilterable form and caused eventual gelling of the solution." Also, as reported in Industrial and Engineering Chemistry, vol. 42, October 1950, page 2181, "The use of wet-process acid in the continuous saturator process would introduce difficulties not encountered in use of electric-furnace acid. On ammoniation, impurities in the acid formed practically unfilterable precipitates that hindered separation of product crystals from mother liquor, and after about 10 hours of operation, the saturator liquor gelled.

"Other small scale tests have indicated that the crystallization process is unsuited to production of diammonium phosphate from unpurified wet-process phosphoric acid."

I have discovered that diammonium orthophosphate, as well as monoammonium orthophosphate, can be produced directly from the wet-process phosphoric acid containing the impurities, the resulting phosphate products being of high purity while also utilizing the motor liquor and the impurities themselves in the production of salable phosphate products.

A primary object, therefore, of the invention is to provide a means and method for the recovery of high purity monoammonium and diammonium orthophosphates from impure phosphoric acids, including wet-process phosphoric acids. Another object is to provide a method of recovery of valuable phosphate material from the residual mother liquor after the removal of the ammonium orthophosphates. A further object is to provide a process for the recovery of ammonium orthophosphates from saturated mother liquor and for the recovery of precipitates and filtrates from the treated residual mother liquor and the conversion thereof into salable valuable phosphate products. Other specific objects and advantages will appear as the specification proceeds.

In one embodiment of the invention, wet-process phosphoric acid is treated for the recovery of monoammonium otherophosphate, utilizing a specific pH range and employing acid material within a selected range of specific gravity, and in another embodiment of the invention diammonium orthophosphate of high purity is produced while employing a pH in a different range. In the process, ammonia and phosphoric acid are passed into the saturated mother liquor maintained within the desired pH range while at the same time agitating to effect peptization of impurities. Preferably, I form minute air bubble nuclei in the mother liquor to promote crystallization of the desired ammonium orthophosphate.

The minute air bubble nuclei may be generated within the mother liquor by any suitable means such as by sparging air through porous stainless steel or other fine-opening sparging devices, by bleeding air into the centrifugal pump intake line, or by any other suitable means.

In the foregoing operations, conventional crystallization equipment and circuits may be employed as, for example, by bringing the reactants together into a saturator or reaction vessel, with provision for adequate agitation, as by a recycling pump and by employing the usual crystal slurry surge and holding tanks, centrifuges, and dryers.

In the manufacture of monoammonium orthophosphate of high purity, the process, as described above, consists of peptization of impurities and concurrent deposition of high purity monoammonium orthophosphate crystals. Peptization of iron, aluminum, calcium fluosilicates, fluorides, and other impurities, is accomplished by agitation of the mother liquor and reaction mixture. Tangential recirculation of the mother liquor and reaction mixture with a centrifugal pump is adequate to effect colloidal dispersion of impurities in the mother liquor.

Rapid concurrent crystallization of high purity monoammonium orthophosphate is effected by employing a critical pH range and preferably a specific gravity control. The pH is the factor determining the crystalline phase with respect to and in equilibrium with the mother liquor and reaction mixture, while also determining viscosity by virtue of solute concentration. The optimum pH range is about 4.5 to 5.8. The optimum of the specific gravity, which varies with the concentration of solute and dispersed phase colloidal impurities at a constant temperature, is about 1.250 to 1.400.

In the manufacture of diammonium orthophosphate, I follow the procedure outlined above except that the pH is maintained in the range of 5.9 to 8.00, the optimum range being about 6.4–7.8. The specific gravity is preferably maintained within the range described above, and the minute air bubbles may be formed as nuclei during the crystallization operation.

I have discovered that the impurity-contaminated and saturated mother liquor remaining after the recovery of the ammonium orthophosphates described above can be treated to produce valuable products. In one procedure, the mother liquor is reacted with an alkaline earth oxide, hydroxide or carbonate, to form a solid phase precipitate consisting of a mixture of fluorides, fluosilicates and phosphates of the alkaline earth compound used, iron and aluminum and complexes thereof, while the liquid phase or filtrate obtained contains essentially combinations of monoammonium orthophosphate and diammonium orthophosphate in aqueous solution. If desired, the ammonium phosphate-rich filtrate or liquid phase can be either fed back to the processes heretofore described for the production of monoammonium orthophosphate or diammonium orthophosphate, or to a conventional ammoniation-granulation unit to "upgrade" nitrogen and/or phosphate content of the multi-nutrient reaction mixture. If desired, the solid phase or precipitate may be either dried for sale or utilized prior to drying as a phosphatic compound for phosphatic or multi-nutrient mixtures through the use of conventional processes.

The foregoing reaction between the mother liquor and the alkaline earth may be carried out in a reaction vessel equipped with agitation means, and the subsequent filtration, centrifuging or decantation may be carried out to effect separation of liquid and solid phase components. Drying and sizing operations may be carried out in conventional phosphatic or multi-nutrient equipment.

As an alternative process, the solid phase or precipitate obtained through the action of the alkaline earths above described may be reacted with a mineral acid (preferably sulfuric acid) to produce a crude phosphoric acid and insoluble residuum consisting essentially of sulphates and fluosilicates of the alkaline earth. The crude phosphoric acid may be reacted with phosphate rock to produce triple superphosphate, or it may be used per se in an ordinary ammoniation-granulation unit to produce conventional phosphatic or multi-nutrient products.

In the utilization of residue from mother liquor I prefer to employ the following controls:

Alkaline earth, or the equivalent (magnesium excluded) to anion (derived from combined hydrofluosilicic, hydrofluoric and sulfuric acid content) equivalent weight ratio is of importance. Excess alkaline earth oxide equivalent results in a $P_2O_5$ loss (via insoluble alkaline earth compounds) and poor separation of solid and liquid phases. Excess anion equivalent results in liquid phase $P_2O_5$ content dilution and increased liquid phase cost per unit of $P_2O_5$.

I am also able to obtain valuable and salable mixtures of insoluble calcium phosphates, iron and aluminum phosphates, fluosilicates of calcium, iron and aluminum, fluorides of calcium, iron and aluminum, or complexes thereof, and also, as a separate product, high purity diammonium sulphate crystals through the reaction of the contaminated saturated mother liquor with ammonia and calcium sulphate. In other words, the residual saturated mother liquor obtained from the processes from which monoammonium orthphosphate and diammonium orthophosphates are obtained by crystallization steps and which contains the contaminants or impurities, may be utilized for obtaining valuable products by reacting the mother liquor with ammonia and calcium sulphate.

The latter process is dependent upon double decomposition of diammonium orthophosphate and calcium sulphate to yield diammonium sulphate and tricalcium orthophosphate, coupled with the resultant insolubility of the contaminants in the aqueous diammonium sulphate liquid phase. Separation of the solid and liquid phases is accomplished by filtration, centrifugation, etc., and the liquid phase is then crystallized to produce high purity diammonium sulphate. The solid phase may be dried and classified or employed in the manufacture of phosphatic or multi-nutrient mixtures, etc. The degree of double decomposition existing with respect to diammonium orthophosphate and calcium sulphate as well as the solubility of the contaminants, is accomplished by employing a pH in the range of 7.5–8.5.

Specific examples of the foregoing processes may be set out as follows:

Example I 100 parts by weight of wet process phosphoric acid containing 27.6 parts by weight of $P_2O_5$ was substantially neutralized with ammonia in the presence of 186 parts of a mother liquid from a prior run. There was continuous agitation of the reaction mixture throughout the neutralization steps, by a centrifugal pump and air was slowly, continuously introduced into the pump intake line. The specific gravity of the reaction mixture was 1.3420 at 89° F. The temperature of the reaction mixture was 160° F. and its pH was 7.5. The diammonium orthophosphate crystals which were formed were withdrawn and separated from the reaction, washed with saturated diammonium phosphate solution and then air dried. The yield contained 31.7 parts per weight of a diammonium orthphosphate product having the following analysis:

Lab. No. KA-1-4A: Percent
Water soluble $P_2O_5$ ---------------- 53.00
Nitrogen -------------------------- 21.00
$Fe_2O_3$ -------------------------- 0.01
$Al_2O_3$ -------------------------- 0.020
F ------------------------------- 0.065

Subsequent reaction of a 100 parts by weight of the residual mother liquid containing 50.8 parts by weight by calcium sulfate and approximately 3.8 parts by weight of ammonia followed by filtration of the reaction mixture produced a filtrate which upon drying yielded 56.6 parts per weight of a product of the following analysis:

Percent
Nitrogen ---------------------------- 16.5
$P_2O_5$ ---------------------------- 13.5

(the product is substantially a mixture of a diammonium sulfate, monoammonium phosphate and diammonium phosphate) and a residue which upon drying yielded approximately 39.4 parts by weight of a product containing approximately 7.8% nitrogen and 33.2% available $P_2O_5$.

Example II 100 parts by weight of wet process phosphoric acid containing 24.25 parts by weight of $P_2O_5$ was neutralized with ammonia in the presence of 200 parts of mother liquid from a prior run to a pH of approximately 5.2. The reaction mixture was continuously agitated throughout the neutralization by a centrifugal pump. The specific gravity of the reaction mixture was 1.301 at 80° F. The temperature of the reaction mixture was approximately 180° F. The monoammonium orthophosphate crystals which were formed were withdrawn and separated from the reaction mixture. The crystals were washed with saturated monoammonium phosphate solution and then air dried. The yield contained 28.7 parts by weight of monoammonium phosphate product having the following analysis:

Percent
Water soluble $P_2O_5$ ---------------- 61.05
Nitrogen -------------------------- 12.06
$Fe_2O_3$ -------------------------- 0.03
$Al_2O_3$ -------------------------- 0.04
F ------------------------------- 0.11

Subsequent reaction of 100 parts by weight of the residual mother liquor and 26.2 parts by weight of calcium carbonate followed by filtration or other means of separation produced a filtrate which upon drying yielded 38 parts by weight of a product containing approximately 15% nitrogen and 50.5% available $P_2O_5$ (the product is substantially a diammonium phosphate and monoammonium phosphate) and a residue which upon drying yielded 40.3 parts by weight of a product containing approximately 1.85% nitrogen and 21.4% total $P_2O_5$.

Example III 100 parts by weight of a wet process phosphoric acid contained 24.25 parts by weight of a $P_2O_5$ was substantially neutralized with ammonia in the presence of approximately 186 parts by weight of mother liquor from a prior run. The reaction mixture was continuously agitated throughout the neutralization steps by a centrifugal pump and air was slowly and continuously introduced into the pump intake line. The specific gravity of the reaction mixture was 1.3260 at 84° F. The temperature of the reaction mixture was approximately 140° F. and its pH was 7.4. The diammonium orthophosphate crystals which were formed were separated from the reaction mixture, washed with saturated diammonium phosphate solution which removed adhering mother liquor contamination, then air dried. The yield contained approximately 32.9% parts by weight of a diammonium orthophosphate product having a following analysis:

Percent
Water soluble $P_2O_5$ ---------------- 53.5
Nitrogen -------------------------- 20.85
$Fe_2O_3$ -------------------------- 0.015
$Al_2O_3$ -------------------------- 0.019
F ------------------------------- 0.017

Subsequent simultaneous granulation and drying in a conventional process equipment of 100 parts by weight of mother liquor from this run yielded approximately 58.6 parts by weight of a product having the following analysis, 15.5% nitrogen and 40.0% available $P_2O_5$.

I claim:
1. In a process for the production of ammonium orthophosphates from ammonium orthophosphate mother liquor containing metal salt and fluoride impurities and having a specific gravity of about 1.250–1.400, the steps of passing ammonia and wet process phosphoric acid into the mother liquor in proportions for maintaining the mother liquor within a pH range of 4.5–8.0 and maintaining the mixture at a reaction temperature effective for the neutralization of the phosphoric acid by said ammonia while continuously agitating the reaction mixture and introducing minute air bubble nuclei to bring about crystallization of the ammonium orthophosphate selected from the group consisting of monoammonium orthophosphate and diammonium orthophosphate, and separating the crystallized ammonium orthophosphate from the mother liquor.

2. The process of claim 1 in which the pH of the reaction mixture is maintained in the range of about pH 4.5–5.8 to produce monoammonium orthophosphate.

3. The process of claim 1 in which the pH of the reaction mixture is maintained in the range of pH 5.9–8.0 to produce diammonium orthophosphate.

4. The process of claim 3 in which the pH is maintained at about 6.4–7.8.

5. In a process for preparing monoammonium orthophosphate from wet ammonium orthophosphate mother liquor containing metal salt and fluoride impurities and having a specific gravity of about 1.250–1.400, the steps of passing ammonia and wet process phosphoric acid into said mother liquor in proportions for maintaining the mother liquor at a pH of about 4.5–5.8 while heating the mixture to a reaction temperature of about 140–180° F. while continuously agitating the reaction mixture and introducing air into the agitated mixture to produce air bubble nuclei for crystallizing monoammonium orthophosphate, and separating the crystallized monoammonium orthophosphate from the reaction mixture.

References Cited

UNITED STATES PATENTS

| | | | |
|---|---|---|---|
| 393,428 | 11/1888 | Giles et al. | 23—165 |
| 1,142,068 | 6/1915 | Washburn | 23—107 |
| 1,208,877 | 12/1916 | Wallenweber | 23—107 |
| 1,699,393 | 1/1929 | Hagens et al. | 23—119 X |
| 1,876,011 | 9/1932 | Larsson | 23—107 |
| 1,936,168 | 11/1933 | Larsson | 23—107 |
| 2,033,388 | 3/1936 | Moose | 23—107 |
| 2,033,389 | 3/1936 | Moose | 23—107 |
| 2,287,264 | 6/1942 | Ogburn | 23—109 |
| 2,792,286 | 5/1957 | Wordie et al. | 23—107 |

OTHER REFERENCES

Van Wazer: Phosphorus and Its Cpds., vol. II, pp. 1084, 1104.

Weissberger: Technique of Organic Chem., vol. 3, 2nd ed., p. 482, Interscience, 1956, New York.

OSCAR R. VERTIZ, *Primary Examiner.*

MAURICE A. BRINDISI, *Examiner.*

O. F. CRUTCHFIELD, *Assistant Examiner.*